United States Patent
Sypek et al.

(10) Patent No.: US 12,298,091 B2
(45) Date of Patent: May 13, 2025

(54) HEAT EXCHANGER WITH HEADER EMBEDDED COOLING CHANNELS

(71) Applicant: Hamilton Sundstrand Corporation, Charlotte, NC (US)

(72) Inventors: John T. Sypek, Bolton, CT (US); Anthony Emilio DeVita, Enfield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 97 days.

(21) Appl. No.: 17/938,500

(22) Filed: Oct. 6, 2022

(65) Prior Publication Data

US 2024/0118044 A1    Apr. 11, 2024

(51) Int. Cl.
   *F28F 9/02*    (2006.01)

(52) U.S. Cl.
   CPC .................... *F28F 9/02* (2013.01)

(58) Field of Classification Search
   CPC .......... F28F 9/02; F28F 9/0219; F28F 9/0234; F28F 2009/0295; F28F 2255/00; F28F 2009/0287; F02C 7/18; F02C 7/14; F02C 7/141; F02C 7/185; F02C 7/16; F02K 3/105; F28D 1/0461; F28D 2021/0026; F28D 7/0066; F28D 9/0093; F05D 2260/213; F05D 2260/941; F05D 2260/20; F05D 2260/221
   See application file for complete search history.

(56) References Cited

U.S. PATENT DOCUMENTS

| | | | |
|---|---|---|---|
| 4,685,292 A * | 8/1987 | Brigham | F28F 9/0234 60/320 |
| 5,823,250 A * | 10/1998 | Barten | F28F 9/0234 165/169 |
| 6,904,965 B2 | 6/2005 | Beck et al. | |
| 10,060,353 B2 * | 8/2018 | Duesler | F02C 7/32 |
| 10,487,742 B2 | 11/2019 | Elder | |
| 2004/0188070 A1 * | 9/2004 | Kruger | F28F 9/0219 165/135 |
| 2008/0053059 A1 * | 3/2008 | Olver | F02C 7/141 60/226.1 |
| 2014/0299115 A1 | 10/2014 | Zhang et al. | |
| 2019/0219337 A1 | 7/2019 | Twelves et al. | |
| 2021/0222624 A1 * | 7/2021 | Wiedenhoefer | F02K 3/105 |

FOREIGN PATENT DOCUMENTS

DE    102012111961 A1    6/2014

OTHER PUBLICATIONS

Extended European Search Report for EP Application No. 23202169.1, Dated Feb. 22, 2024, pp. 8.

* cited by examiner

*Primary Examiner* — Harry E Arant
(74) *Attorney, Agent, or Firm* — Kinney & Lange, P.A.

(57) ABSTRACT

A heat exchanger includes a heat exchanger core including a cold side and a hot side. The cold side directs a first cooling fluid from a cold inlet to a cold outlet. The hot side directs a hot fluid from a hot inlet to a hot outlet. An inlet header coupled to the hot side of the heat exchanger core at the hot inlet includes an interior wall and an exterior wall spaced apart from the interior wall. The interior wall defines an inlet duct; the interior wall and exterior wall define a cooling channel surrounding at least a portion of the inlet duct. The inlet duct directs hot fluid though the inlet header to the hot side. The cooling channel directs a second cooling fluid through the cooling channel.

20 Claims, 3 Drawing Sheets

HEAT EXCHANGER WITH HEADER EMBEDDED COOLING CHANNELS

BACKGROUND

The present disclosure relates generally to heat exchangers, and more particularly to heat exchangers including in an inlet header.

Heat exchangers used in high temperature and high pressure environments experience various stresses that impact the useful life of the heat exchanger. For example, in some situations, the different sections or parts of the heat exchanger are exposed to extreme temperature differences which cause the different sections or parts of the heat exchanger to have differing thermal expansion characteristics. In one example, a heat exchanger core can be exposed to relatively cool fluid flow while a hot inlet of the heat exchanger can be exposed to hot fluid flow. In such a situation, the hot inlet can experience greater thermal expansion than the heat exchanger core during operation of the heat exchanger. The differing thermal expansion characteristics can induce stresses in the heat exchanger that can cause failure or a limited life of the heat exchanger.

SUMMARY

According to one aspect of the disclosure, a heat exchanger includes a heat exchanger core including a cold side having a cold inlet and a cold outlet, and a hot side having a hot inlet and a hot outlet. The cold side is configured to direct a first cooling fluid from the cold inlet to the cold outlet when the heat exchanger is in operation. The hot side is configured to direct a hot fluid from the hot inlet to the hot outlet when the heat exchanger is in operation. An inlet header is coupled to the hot side of the heat exchanger core at the hot inlet. The inlet header includes an interior wall and an exterior wall spaced apart from the interior wall such that the interior wall defines an inlet duct. The interior wall and exterior wall define a cooling channel surrounding at least a portion of the inlet duct, which is configured to direct the hot fluid though the inlet header to the hot side when the heat exchanger is in operation. The inlet duct is fluidly isolated from and thermally connected to the cooling channel. The cooling channel is configured to direct a second cooling fluid through the cooling channel when the heat exchanger is in operation.

According to another aspect of the disclosure, a heat exchanger for use in a gas turbine engine has a heat exchanger core including a cold side having a cold inlet and a cold outlet, and a hot side having a hot inlet and a hot outlet. The cold side is configured to direct a first cooling fluid from the cold inlet to the cold outlet when the heat exchanger is in operation. The hot side is configured to direct a hot fluid from the hot inlet to the hot outlet when the heat exchanger is in operation. An inlet header is coupled to the hot side of the heat exchanger core at the hot inlet. The inlet header includes an interior wall and an exterior wall spaced apart from the interior wall such that the interior wall defines an inlet duct. The interior wall and exterior wall define a cooling channel surrounding at least a portion of the inlet duct. The inlet duct is configured to direct the hot fluid though the inlet header to the hot side when the heat exchanger is in operation and is fluidly isolated from and thermally connected to the cooling channel. The cooling channel is configured to direct a second cooling fluid through the cooling channel when the heat exchanger is in operation. The heat exchanger core is positioned within a bypass duct of the gas turbine engine and receives air from a gas turbine engine bypass flow path as the first cooling fluid and the inlet header of the heat exchanger receives a hot fluid from a gas turbine engine core.

According to yet another aspect of the disclosure, a method of operating a heat exchanger positioned within a gas turbine engine includes positioning the heat exchanger in a bypass flow path of the gas turbine engine. A bypass air flow is flowed through the bypass flow path of the gas turbine engine such that a first portion of the bypass air flow flows through a cold side of the heat exchanger as a first cooling fluid. A hot fluid from a gas turbine engine core is flowed through an inlet duct of the inlet header to a hot side of the heat exchanger such that the hot fluid flows through the hot side of the heat exchanger. The hot fluid flowing through the hot side of the heat exchanger is cooled by transferring heat from the hot fluid to the first cooling fluid flowing through the cold side of the heat exchanger. The first cooling fluid and the hot fluid are fluidly isolated. The inlet header is cooled by flowing a second cooling fluid through a cooling channel surrounding at least a portion of an inlet duct of the inlet header.

DETAILED DESCRIPTION

As discussed above, in certain applications a hot inlet to a heat exchanger can operate at enough of a temperature difference from a cooler heat exchanger core to create greater thermal expansion the hot inlet than at the cooler heat exchanger core during operation of the heat exchanger. The differing thermal expansion characteristics can induce stresses in the heat exchanger that can cause failure or a limited life of the heat exchanger. The impact of thermal stresses can be exacerbated by repeated hot and cold cycling of the heat exchanger, for example when the heat exchanger is operation for a certain time followed by and/or preceded by a period during which the heat exchanger is not in operation. One application that can create such condition is use of a heat exchanger in an aircraft gas turbine engine, particularly where the hot inlet of the heat exchanger receives a hot stream from the gas turbine engine and uses air at ambient high altitude conditions on a cold side of the heat exchanger. While conditions can exist in other applications, this disclosure will use an aircraft gas turbine engine as a non-limiting exemplary environment. It will be understood that a heat exchanger that is the subject of this disclosure can be used in a multitude of different environments as well.

Figure 1:
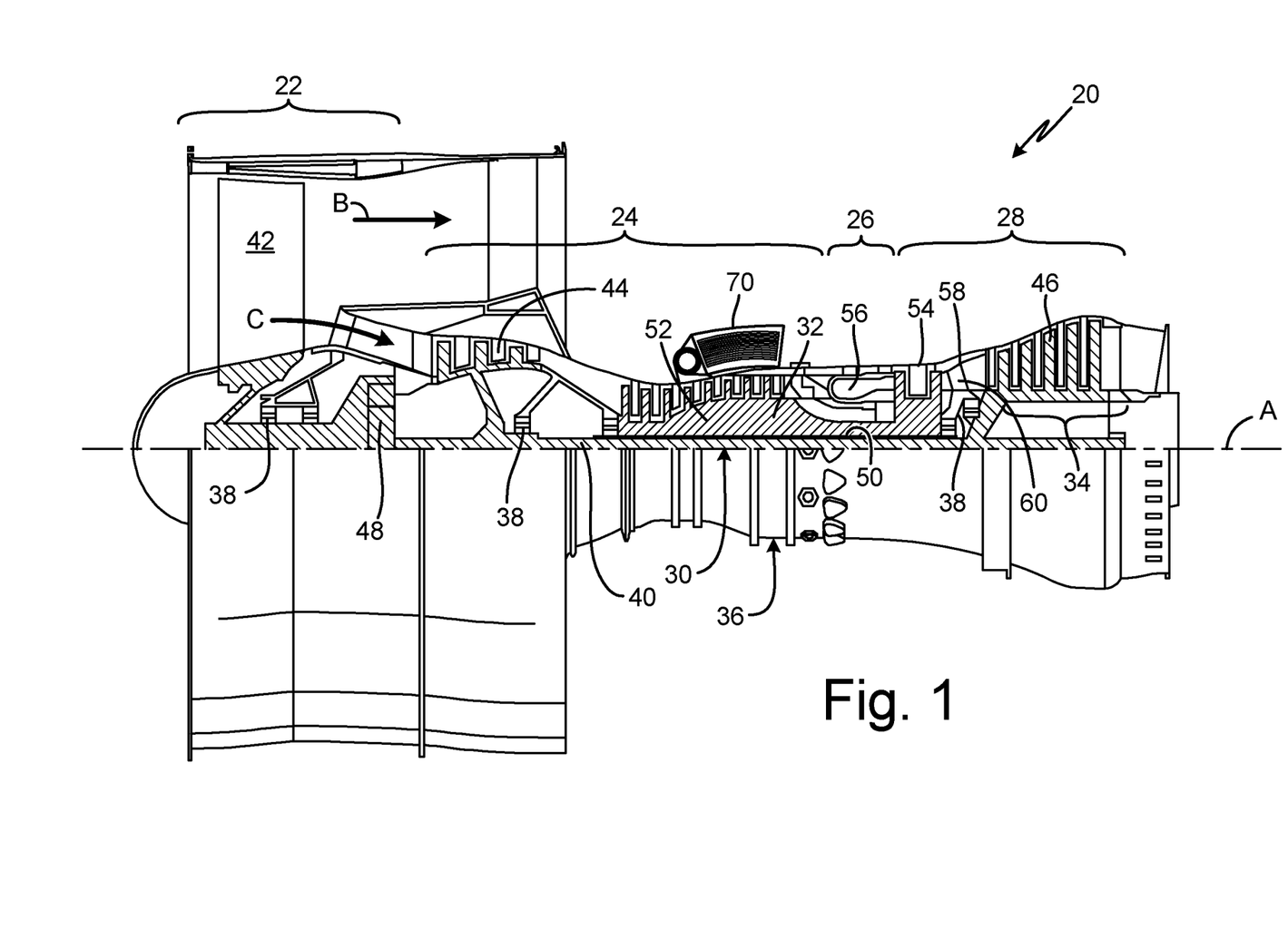
FIG. 1 is a cross-sectional view of an exemplary aircraft gas turbine engine including a heat exchanger.

FIG. 1 schematically illustrates a gas turbine engine 20 that serves as a non-limiting exemplary environment for this disclosure. The gas turbine engine 20 is depicted as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle (not shown), while the compressor section 24 drives air along a gas turbine engine core flow path C for compression and communication into the combustor section 26 then expansion through the turbine section 28. Compressor section 24, combustor section 26, and turbine section 28 can be referred to collectively as the gas turbine engine core. Although depicted as a two-spool turbofan gas turbine engine, it should be understood that the concepts described in this disclosure are not limited to use with two-spool turbofans as the teachings may be applied to other types of turbine engines including three-spool architectures, turbojet engines, turboprop engines, and other gas turbine engine configurations.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in gas turbine engine 20 is illustrated as a geared architecture 48 to drive the fan 42 at a lower speed than the low speed spool 30. The high speed spool 32 includes an outer shaft 50 that interconnects a high pressure compressor 52 and a high pressure turbine 54. A combustor 56 is arranged in gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The gas turbine engine core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the gas turbine engine core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

FIG. 1 includes a schematic depiction of heat exchanger 70 positioned in bypass flow path B in a bypass duct (not shown explicitly). It should be understood that air flowing through bypass flow path B can be a source of cooling fluid for heat exchanger 70.

Figure 2:
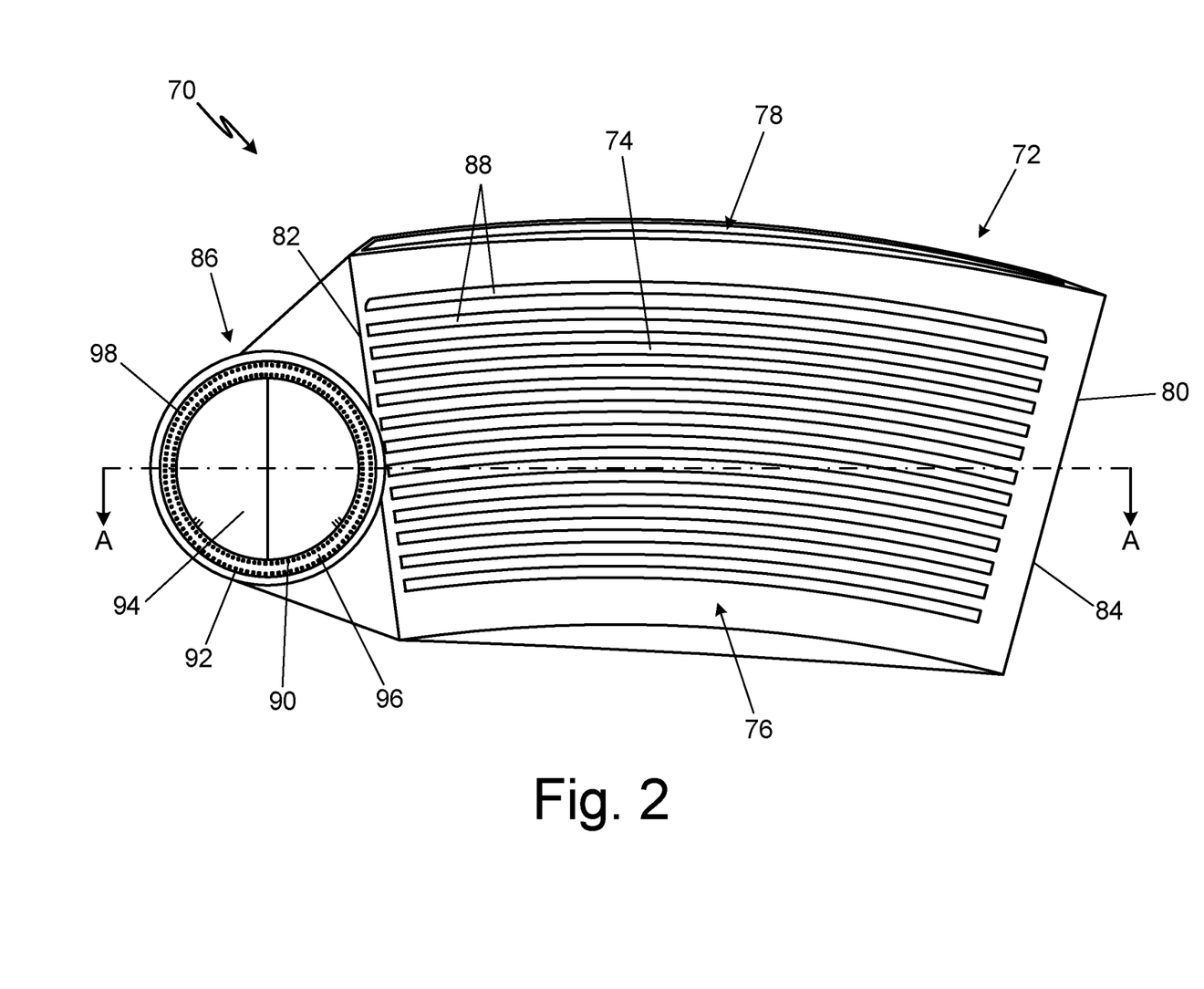
FIG. 2 is a front perspective view of a heat exchanger including an inlet header.

FIG. 2 is a front perspective view of heat exchanger 70. Heat exchanger 70 includes heat exchanger core 72 having a cold side 74 with a cold inlet 76 and a cold outlet 78 and a hot side 80 with a hot inlet 82 and a hot outlet 84. Heat exchanger 70 also includes an inlet header 86. As shown in FIG. 1, in one application heat exchanger 70 is positioned within gas turbine engine 20 and heat exchanger 70 is configured to transfer heat between a source and a working fluid. More specifically, in the example shown, heat exchanger 70 is configured to transfer heat between a source of hot fluid (e.g., from the gas turbine engine core: compressor section 24, particularly high pressure compressor 52, combustor section 26, and turbine section 28) of gas turbine engine 20 and a source of cold fluid (e.g., bypass flow path B) of gas turbine engine 20. It is to be understood that the terms "hot" and "cold" used in the following discussion are relative to each other, such that "cold" and "cooling" mean temperatures is lower than the "hot" sections/fluid flows within heat exchanger 70 and gas turbine engine 20. In some examples, the temperature in "hot sections" or "hot fluid flow" be up to 1200° C. (or higher) and temperature in the "cold section" or "cooling fluid" be as cold as −55° C. (or colder). In other examples, the specific temperature ranges of the "hot sections", "hot fluid flow", "cold section", and "cooling fluid" can be between different temperature ranges, depending on the configuration of gas turbine engine 20, among other variables. Of course, in environments other than exemplary gas turbine engine 20, even different temperature ranges may be experienced.

Heat exchanger 70 being positioned within gas turbine engine 20 introduces heat exchanger 70 to a high temperature and high pressure working environment, causing stresses to heat exchanger 70 that can impact the useful life of heat exchanger 70. More specifically, heat exchanger core 72 of heat exchanger 70 is positioned within bypass flow path B and heat exchanger core 72 is configured to receive a first cooling fluid flow 100 (see FIG. 3), and inlet header 86 of heat exchanger 70 is configured to receive a hot fluid flow 102 (see FIG. 3) from gas turbine engine 20. As such, heat exchanger core 72 and inlet header 86 can be exposed to extreme temperature differences during operation of gas turbine engine 20. Specifically, the first cooling fluid 100 flowing through heat exchanger core 72 causes heat exchanger core 72 to have a significantly lower temperature than inlet header 86, with the hot fluid 102 flowing through inlet header 86. The temperature difference between heat exchanger core 72 and inlet header 86 can induce undesirable stresses in heat exchanger 70 in the form of thermal fight.

Thermal fight is a term used to describe the issues caused by differing thermal expansion characteristics of components. For example, the different temperature fluids flowing through heat exchanger 70 can cause the different sections or portions of heat exchanger 70 to expand a different rates. In the example shown, the hot fluid 102 flowing through inlet header 86 causes inlet header 86 to expand to a greater degree than heat exchanger core 72 with first cooling fluid 100 flowing through heat exchanger core 72. In examples in which heat exchanger core 72 and inlet header 86 are constructed from the same material, the differing temperatures and degrees of thermal expansion between inlet header 86 and heat exchanger core 72 can induce undesirable stresses in heat exchanger 70, such as at the connection points between the hot side 80 (and cold side 74 (e.g., the interface points between inlet header 86 and heat exchanger core 72) of heat exchanger 70.

Specifically, thermal fight at the corners and/or intersection points of heat exchanger core 72 and inlet header 86 can generate high stresses in those locations that will eventually cause failure or limited life of heat exchanger 70. As such, it is desirable to reduce the temperature at the interface of inlet header 86 with heat exchanger core 72 during operation of gas turbine engine 20 to minimize thermal fight issues at the corners and/or intersection points of heat exchanger core 72 and inlet header 86. Reducing the temperature (i.e., cooling) at the interface of inlet header 86 with heat exchanger core 72 can prevent or reduce cracking, rupturing, and/or other damage to heat exchanger 70.

Figure 3:
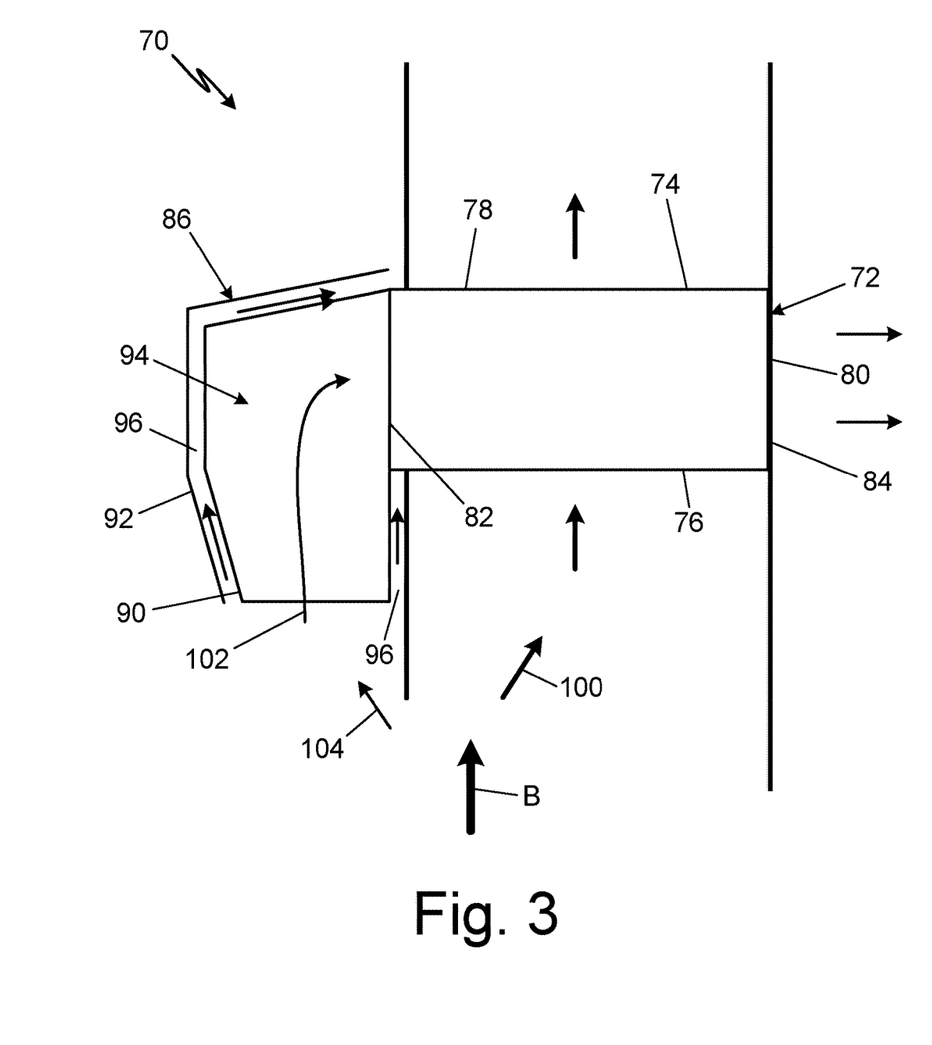
FIG. 3 is a schematic cross-sectional view of the heat exchanger taken along section line A-A shown in FIG. 2.

FIG. 3 is a cross-sectional view of heat exchanger 70 taken along section line A-A shown in FIG. 2. FIGS. 2-3 will be discussed in more detail together. Heat exchanger 70 includes heat exchanger core 72 and inlet header 86 coupled to heat exchanger core 72. In some examples, inlet header 86 can be coupled to heat exchanger core 72 through a brazed connection or a welded connection. In other examples, heat exchanger core 72 and inlet header 86 can be constructed from as a single monolithic component using an additive manufacturing or casting process. Further, in some examples heat exchanger core 72 and inlet header 86 can be constructed from the same material, resulting in heat exchanger core 72 and inlet header 86 having the same coefficient of thermal expansion.

In the example shown, heat exchanger core 72 has a generally curved rectangular shape to conform to the internal shape of the bypass duct of gas turbine engine 20. In other examples, heat exchanger core 72 can have any other geometric shape. Heat exchanger core 72 includes a cold side 74 including cold inlet 76, and cold outlet 78 and a hot side 80 including hot inlet 82 and hot outlet 84. Optionally heat exchanger core 72 can include a plurality of cold side fins 88. Cold inlet 76 is positioned on an inlet to the cold side 74 of heat exchanger core 72 and cold inlet 76 is configured to receive and allow a first cooling fluid 100 to flow through core 72. Cold outlet 78 is positioned on an outlet to the cold side 74 of heat exchanger core 72 and cold outlet 78 is configured to allow the first cooling fluid flowing 100 within heat exchanger core 72 to exit heat exchanger core 72 through cold outlet 78. In some examples, as shown in FIG. 1, heat exchanger core 72 can be positioned within bypass duct of gas turbine engine 20 such that cool air from bypass flow path B can enter cold inlet 76 as first cooling fluid 100, flow through heat exchanger core 72, and then flow out from heat exchanger core 72 through cold outlet 78 to rejoin bypass flow path B. In the example shown in FIG. 2, cold inlet 76 includes a plurality of channels or openings generally oriented parallel or concentric with each other that allows the first cooling fluid 100 to enter heat exchanger core 72. Although not shown, it is to be understood that cold outlet 78 can have a similar or the exact same configuration as cold inlet 76. It will be understood that the cold inlet 76 and cold outlet 78 can have any configuration appropriate for a particular application.

Hot inlet 82 is positioned on an inlet to the hot side 80 of heat exchanger core 72 and hot inlet 82 is configured to receive and allow a hot fluid 102 to flow through heat exchanger core 72. Hot outlet 84 is positioned on an outlet to the hot side 80 of heat exchanger core 72 and hot outlet 84 is configured to allow the hot fluid 102 flowing through heat exchanger core 72 to exit heat exchanger core 72 through hot outlet 84. In some examples, as shown, the hot fluid 102 flowing from hot inlet 82 to hot outlet 84 flows in a direction perpendicular to the first cooling fluid 100 flowing from cold inlet 76 to cold outlet 78. Further, in some examples, the hot fluid 102 can flow from gas turbine engine 20 through inlet header 86 to hot inlet 82. The hot fluid 102 can then enter heat exchanger core 72 through hot inlet 82, flow through heat exchanger core 72, and then flow out from heat exchanger core 72 through hot outlet 84. Although not shown, it is to be understood that hot inlet 82 and hot outlet 84 can have a similar configuration as cold inlet 76 or any other configuration appropriate for a particular application.

The fluid channels extending between cold inlet 76 and cold outlet 78 and the fluid channels extending between hot inlet 82 and hot outlet 84 are fluidly isolated such that the cooling fluid and the hot fluid do not mix during use of heat exchanger 70. Further, the fluid channels extending between cold inlet 76 and cold outlet 78 and the fluid channels extending between hot inlet 82 and hot outlet 84 are in thermal communication, such that the cooling fluid flowing through heat exchanger core 72 is configured to remove heat from and reduce the temperature (i.e., cool) of the hot fluid 102 flowing through heat exchanger core 72, discussed below. In some examples, heat exchanger core 72 can include a plurality of cold side fins 88 positioned within the fluid channels extending between cold inlet 76 and cold outlet 78. The plurality of cold side fins 88 can be fins or ribs of any shape and size that extend within the cold fluid channels to increase the rate of heat transfer between the cooling fluid and the hot fluid. Although not shown, the fluid channels extending between hot inlet 82 and hot outlet 84 can include a plurality of hot side fins (not shown) of any shape and size that extend within the hot fluid channels to increase the rate of heat transfer between the cooling fluid and the hot fluid.

Inlet header 86 is coupled to heat exchanger core 72 at the inlet to the hot side 80 of heat exchanger core 72 such that inlet header 86 is coupled to and in fluid communication with hot inlet 82 of heat exchanger core 72. As discussed, in some examples, inlet header 86 can be coupled to heat exchanger core 72 through a brazed connection or a welded connection. In other examples, heat exchanger core 72 and inlet header 86 can be constructed from as a single monolithic component using an additive manufacturing or casting process. Inlet header 86 includes interior walls 90 and exterior walls 92 that are spaced apart from interior walls 90. Interior walls 90 defines an inlet duct 94. The space between interior walls 90 and exterior walls 92 defines a cooling channel 96 that surrounds at least a portion of the inlet duct 94. In some examples, cooling channel 96 fully surrounds the interior walls 90 of inlet header 86 to form a full cooling channel shell around the inlet duct 94. In other examples, cooling channel 96 partially surrounds the interior walls 90 of inlet header 86 to form a partial cooling channel shell around the inlet duct 94. Depending on heat transfer requirements or other requirements of a particular application, cooling channel 96 can include a plurality of cooling channel fins 98. Exterior wall 92 of inlet header 86 is the outer structure of inlet header 86 that defines the outer shape of inlet header 86. In the example shown, inlet header 86 includes a generally circular cross-sectional shape and inlet header 86 is a generally tubular structure. In other examples, inlet header 86 can have any geometric shape that allows a hot fluid to flow through inlet header 86. As shown best in FIG. 3, interior wall 90 defines inlet duct 94, which is the open space within an interior of interior wall 90. Further, inlet duct 94 is the volume within interior wall 90 of inlet header 86 in which the hot fluid flows from gas turbine engine 20 to hot inlet 82 of heat exchanger core 72. As such, inlet duct 94 will have a shape and size correlating to an interior surface of interior wall 90. In the example shown, inlet duct 94 has a generally tubular shape, but in another example inlet duct 94 can have any geometric shape.

Cooling channel 96 is a channel or open space positioned between interior wall 90 and exterior wall 92 of inlet header 86. In some examples, cooling channel 96 can be integral with inlet header 86, such that cooling channel 96 and inlet header 86 are formed as a single monolithic component using an additive manufacturing or casting process. Cooling channel 96 is formed between interior wall 90 and exterior wall 92 of inlet header 86 and cooling channel 96 is fluidly isolated from inlet duct 94 of inlet header 86, preventing the fluid flowing through inlet duct 94 and the fluid flowing through cooling channel 96 from mixing together. In the example shown, cooling channel 96 fully surrounds the interior wall 90 that defines an outer surface of inlet duct 94, forming a full cooling shell around inlet duct 94. In other words, cooling channel 96 extends between each of interior wall 90 and exterior wall 92 of inlet header 86, forming a fully annular channel around inlet duct 94 (FIG. 2). In other examples, cooling channel 96 can partially surround an outer surface of inlet duct 94, forming a partial cooling channel shell around inlet duct 94. In other words, cooling channel 96 can extend only partially around interior wall 90 of inlet header 86. For example, cooling channel 96 may not be present adjacent a portion of inlet duct 94 if cooling channel 96 would abut a flat or orthogonal wall, which would prevent a cooling fluid from exiting cooling channel 96.

Cooling channel 96 is configured to receive a second cooling fluid 104 and then flow the second cooling fluid 104 through cooling channels 96 of inlet header 86 to reduce the temperature at the interface of inlet header 86 with heat exchanger core 72. As shown in FIG. 2, in some examples, cooling channel 96 can include a plurality of cooling channel fins 98 positioned within cooling channel 96 extending fully or partially through a length of cooling channel 96. The plurality of cooling channel fins 98 can be fins or ribs of any shape and size that extend within the cooling channel 96 to increase the rate of heat transfer between the cooling fluid flowing through cooling channel 96 and the hot fluid flowing through inlet duct 94.

Further, in some examples (not depicted), the second cooling fluid 104 flowing through cooling channel 96 can flow within a closed-loop system such that the second cooling fluid 104 does not mix with any other fluids within gas turbine engine 20. In such an example, the second cooling fluid can flow from a fluid reservoir, flow through channels or tubes to cooling channel 96, flow through cooling channel 96 to remove heat from inlet header 86, and then flow through a separate heat exchanger and back to the fluid reservoir. The second cooling fluid in a closed-loop system could be one or more of ethylene glycol, oil, and water, among other options. The flow configuration of a closed-loop system could continuously operate to reduce the temperature at the interface of inlet header 86 with heat exchanger core 72 during operation of gas turbine engine 20.

In other examples, the second cooling fluid 104 flowing through cooling channel 96 can flow within an open system such that the second cooling fluid 104 does mix with other fluids within gas turbine engine 20. As discussed, cooling air is directed from bypass flow path B into and through heat exchanger core 72 as first cooling fluid 100 to reduce the temperature of the hot fluid flowing through heat exchanger core 72. The same cooling air from bypass flow path B can also be directed to flow through cooling channel 96 within inlet header 86 as second cooling fluid 104 to reduce the temperature at the interface of inlet header 86 with heat exchanger core 72. More specifically, a first portion of the cooling air from bypass flow path B can be directed to heat exchanger core 72 as first cooling fluid 100 and a second portion of the cooling air from bypass flow path B can be directed to cooling channel 96 as second cooling fluid 104.

In some examples, the first cooling fluid 100 and the second cooling fluid 104 mix downstream of the heat exchanger 70. For example, as shown in FIG. 3 the first cooling fluid 100 flows through the heat exchanger core 72, exits the heat exchanger core 72, and flows back into the bypass flow path B downstream of the heat exchanger 70. The second cooling fluid 104 flows through the cooling channel 96, exits the cooling channel 96, and flows back into the bypass flow path B downstream of the heat exchanger 70, where the second cooling fluid 104 mixes with the first cooling fluid 100.

DISCUSSION OF POSSIBLE EMBODIMENTS

The following are non-exclusive descriptions of possible embodiments of the present invention.

A Heat Exchanger

A heat exchanger includes a heat exchanger core including a cold side having a cold inlet and a cold outlet, and a hot side having a hot inlet and a hot outlet. The cold side is configured to direct a first cooling fluid from the cold inlet to the cold outlet when the heat exchanger is in operation. The hot side is configured to direct a hot fluid from the hot inlet to the hot outlet when the heat exchanger is in operation. An inlet header is coupled to the hot side of the heat exchanger core at the hot inlet. The inlet header includes an interior wall and an exterior wall spaced apart from the interior wall such that the interior wall defines an inlet duct. The interior wall and exterior wall define a cooling channel surrounding at least a portion of the inlet duct, which is configured to direct the hot fluid though the inlet header to the hot side when the heat exchanger is in operation. The inlet duct is fluidly isolated from and thermally connected to the cooling channel. The cooling channel is configured to direct a second cooling fluid through the cooling channel when the heat exchanger is in operation.

The heat exchanger of the preceding paragraph can optionally include, additionally and/or alternatively, any one or more of the following features, configurations and/or additional components:

A further embodiment of the foregoing heat exchanger in which the cooling channel fully surrounds the interior wall of the inlet header forming a full cooling channel shell around the inlet duct.

A further embodiment of the foregoing heat exchanger in which the cooling channel partially surrounds the interior wall of the inlet header forming a partial cooling channel shell around the inlet duct.

A further embodiment of any of the foregoing heat exchangers in which the cooling channel includes a plurality of cooling channel fins positioned within the cooling channel.

A further embodiment of any of the foregoing heat exchangers in which the first cooling fluid and the second cooling fluid are from the same source.

A further embodiment of the foregoing heat exchangers in which the first cooling fluid and the second cooling fluid mix downstream of the heat exchanger.

A further embodiment of one or more of the foregoing heat exchangers in which the first cooling fluid and the second cooling fluid are from different sources.

A further embodiment of the foregoing heat exchangers in which the cooling channel is configured to receive the second cooling fluid a fluid source within a closed-loop fluid system, and wherein the second cooling fluid is one or more of ethylene glycol, oil, and water.

A further embodiment of any of the foregoing heat exchangers in which the heat exchanger is positioned within a gas turbine engine, and wherein the heat exchanger core is positioned within a bypass duct of the gas turbine engine to receive air from a gas turbine engine bypass flow path as the first cooling fluid and the inlet header of the heat exchanger receives a hot fluid from a gas turbine engine core.

A further embodiment of the foregoing heat exchangers in which the first cooling fluid and the second cooling fluid are both air from the gas turbine engine bypass flow path.

A further embodiment of one or more of the foregoing heat exchangers in which the first cooling fluid is air from the gas turbine engine bypass flow path and the cooling channel is configured to receive the second cooling fluid a fluid source within a closed-loop fluid system, and wherein the second cooling fluid is one or more of ethylene glycol, oil, and water.

A Heat Exchanger for Use in a Gas Turbine Engine

A heat exchanger for use in a gas turbine engine has a heat exchanger core including a cold side having a cold inlet and a cold outlet, and a hot side having a hot inlet and a hot outlet. The cold side is configured to direct a first cooling fluid from the cold inlet to the cold outlet when the heat exchanger is in operation. The hot side is configured to direct a hot fluid from the hot inlet to the hot outlet when the heat exchanger is in operation. An inlet header is coupled to the hot side of the heat exchanger core at the hot inlet. The inlet header includes an interior wall and an exterior wall spaced apart from the interior wall such that the interior wall defines an inlet duct. The interior wall and exterior wall define a cooling channel surrounding at least a portion of the inlet duct. The inlet duct is configured to direct the hot fluid though the inlet header to the hot side when the heat exchanger is in operation and is fluidly isolated from and thermally connected to the cooling channel. The cooling channel is configured to direct a second cooling fluid through the cooling channel when the heat exchanger is in operation. The heat exchanger core is positioned within a bypass duct of the gas turbine engine and receives air from a gas turbine engine bypass flow path as the first cooling fluid and the inlet header of the heat exchanger receives a hot fluid from a gas turbine engine core.

The heat exchanger for use in a gas turbine engine of the preceding paragraph can optionally include, additionally and/or alternatively, any one or more of the following features, configurations and/or additional components:

A further embodiment of the foregoing heat exchanger for use in a gas turbine engine in which the cooling channel fully surrounds the interior wall of the inlet header forming a full cooling channel shell around the inlet duct.

A further embodiment of the foregoing heat exchanger for use in a gas turbine engine in which the cooling channel partially surrounds the interior wall of the inlet header forming a partial cooling channel shell around the inlet duct.

A further embodiment of the any of the foregoing heat exchangers for use in a gas turbine engine in which the cooling channel includes a plurality of cooling channel fins positioned within the cooling channel.

A further embodiment of the any of the foregoing heat exchangers for use in a gas turbine engine in which the cooling channel is configured to receive the second cooling fluid a fluid source within a closed-loop fluid system, and wherein the second cooling fluid is one or more of ethylene glycol, oil, and water.

A Method of Operating a Heat Exchanger Positioned within a Gas Turbine Engine

A method of operating a heat exchanger positioned within a gas turbine engine includes positioning the heat exchanger in a bypass flow path of the gas turbine engine. A bypass air flow is flowed through the bypass flow path of the gas turbine engine such that a first portion of the bypass air flow flows through a cold side of the heat exchanger as a first cooling fluid. A hot fluid from a gas turbine engine core is flowed through an inlet duct of the inlet header to a hot side of the heat exchanger such that the hot fluid flows through the hot side of the heat exchanger. The hot fluid flowing through the hot side of the heat exchanger is cooled by transferring heat from the hot fluid to the first cooling fluid flowing through the cold side of the heat exchanger. The first cooling fluid and the hot fluid are fluidly isolated. The inlet header is cooled by flowing a second cooling fluid through a cooling channel surrounding at least a portion of an inlet duct of the inlet header.

The method of operating a heat exchanger positioned within a gas turbine engine of the preceding paragraph can optionally include, additionally and/or alternatively, any one or more of the following features, configurations and/or additional components:

A further embodiment of the foregoing method of operating a heat exchanger positioned within a gas turbine engine in which flowing a second cooling fluid through a cooling channel includes receiving the second cooling fluid a fluid source within a closed-loop fluid system and flowing the second cooling fluid through the cooling channel, wherein the second cooling fluid is one or more of ethylene glycol, oil, and water.

A further embodiment of the foregoing method of operating a heat exchanger positioned within a gas turbine engine in which flowing a second cooling fluid through a cooling channel includes flowing a second portion of the bypass air flow as a second cooling fluid through the cooling channel.

A further embodiment of the foregoing method of operating a heat exchanger positioned within a gas turbine engine further including flowing the first cooling fluid exiting the cold side into the bypass flow path downstream of the heat exchanger, flowing the second cooling fluid exiting the cooling channel into the bypass flow path downstream of the heat exchanger; and mixing the first cooling fluid and the second cooling fluid within the bypass flow path downstream of the heat exchanger.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine comprising:
  a heat exchanger positioned in a bypass flow path of the gas turbine engine, wherein the heat exchanger further comprises:
  a heat exchanger core comprising a cold side having a cold inlet and a cold outlet, and a hot side having a hot inlet and a hot outlet, wherein the cold side is configured to direct a first cooling fluid from the gas turbine engine bypass flow path from the cold inlet to the cold outlet when the heat exchanger is in operation and the hot side is configured to direct a hot fluid from a gas turbine engine hot section from the hot inlet to the hot outlet when the heat exchanger is in operation;
  an inlet header coupled to the hot side of the heat exchanger core at the hot inlet, wherein the inlet header comprises an interior wall and an exterior wall spaced apart from the interior wall such that the interior wall defines an inlet duct and the interior wall and exterior wall define a fully annular cooling channel surrounding at least a portion of the inlet duct and the inlet duct is configured to direct the hot fluid though the inlet header to the hot side when the heat exchanger is in operation and wherein the exterior wall forms an outer structure of the inlet header and defines an outer shape of the inlet header; and wherein the inlet duct is fluidly isolated from and thermally connected to the cooling channel, and wherein the cooling channel is configured to direct a second cooling fluid through the cooling channel when the heat exchanger is in operation.

2. The heat exchanger of claim 1, wherein the cooling channel fully surrounds the interior wall of the inlet header forming a full cooling channel shell around the inlet duct.

3. The heat exchanger of claim 1, wherein the cooling channel partially surrounds the interior wall of the inlet header forming a partial cooling channel shell around the inlet duct.

4. The heat exchanger of claim 1, wherein the cooling channel includes a plurality of cooling channel fins positioned within the cooling channel.

5. The heat exchanger of claim 1, wherein the first cooling fluid and the second cooling fluid are from the same source.

6. The heat exchanger of claim 5, wherein the first cooling fluid and the second cooling fluid mix downstream of the heat exchanger.

7. The heat exchanger of claim 1, wherein the first cooling fluid and the second cooling fluid are from different sources.

8. The heat exchanger of claim 7, wherein the cooling channel is configured to receive the second cooling fluid a fluid source within a closed-loop fluid system, and wherein the second cooling fluid is one or more of ethylene glycol, oil, and water.

9. The heat exchanger of claim 1, wherein the heat exchanger is positioned within a gas turbine engine, and wherein the heat exchanger core is positioned within a bypass duct of the gas turbine engine to receive air from a gas turbine engine bypass flow path as the first cooling fluid and the inlet header of the heat exchanger receives the hot fluid from a gas turbine engine core.

10. The heat exchanger of claim 9, wherein the first cooling fluid and the second cooling fluid are both air from the gas turbine engine bypass flow path.

11. The heat exchanger of claim 9, wherein the first cooling fluid is air from the gas turbine engine bypass flow path and the cooling channel is configured to receive the second cooling fluid a fluid source within a closed-loop fluid system, and wherein the second cooling fluid is one or more of ethylene glycol, oil, and water.

12. A gas turbine engine comprising:
a heat exchanger positioned in a bypass flow path of the gas turbine engine, wherein the heat exchanger further comprises:
a heat exchanger core comprising a cold side having a cold inlet and a cold outlet, and a hot side having a hot inlet and a hot outlet, wherein the cold side is configured to direct a first cooling fluid from the cold inlet to the cold outlet when the heat exchanger is in operation and the hot side is configured to direct a hot fluid from the hot inlet to the hot outlet when the heat exchanger is in operation;
an inlet header coupled to the hot side of the heat exchanger core at the hot inlet, wherein the inlet header comprises an interior wall and an exterior wall spaced apart from the interior wall such that the interior wall defines an inlet duct and the interior wall and exterior wall define a fully annular cooling channel surrounding at least a portion of the inlet duct and the inlet duct is configured to direct the hot fluid though the inlet header to the hot side when the heat exchanger is in operation and wherein the exterior wall forms an outer structure of the inlet header and defines an outer shape of the inlet header;

wherein the inlet duct is fluidly isolated from and thermally connected to the cooling channel, and wherein the cooling channel is configured to direct a second cooling fluid through the cooling channel when the heat exchanger is in operation; and wherein the heat exchanger core is positioned within a bypass duct of the gas turbine engine and receives air from a gas turbine engine bypass flow path as the first cooling fluid and the inlet header of the heat exchanger receives the hot fluid from a gas turbine engine core.

13. The heat exchanger of claim 12, wherein the cooling channel fully surrounds the interior wall of the inlet header forming a full cooling channel shell around the inlet duct.

14. The heat exchanger of claim 12, wherein the cooling channel partially surrounds the interior wall of the inlet header forming a partial cooling channel shell around the inlet duct.

15. The heat exchanger of claim 12, wherein the cooling channel includes a plurality of cooling channel fins positioned within the cooling channel.

16. The heat exchanger of claim 12, wherein the cooling channel is configured to receive the second cooling fluid a fluid source within a closed-loop fluid system, and wherein the second cooling fluid is one or more of ethylene glycol, oil, and water.

17. A method of operating a heat exchanger positioned within a gas turbine engine, the method comprising:
positioning the heat exchanger in a bypass flow path of the gas turbine engine;
flowing a bypass air flow through the bypass flow path of the gas turbine engine such that a first portion of the bypass air flow flows through a cold side of the heat exchanger as a first cooling fluid;
flowing a hot fluid from a gas turbine engine core through an inlet duct of the inlet header to a hot side of the heat exchanger such that the hot fluid flows through the hot side of the heat exchanger;
cooling the hot fluid flowing through the hot side of the heat by transferring heat from the hot fluid to the first cooling fluid flowing through the cold side of the heat exchanger, wherein the first cooling fluid and the hot fluid are fluidly isolated; and
cooling the inlet header by flowing a second cooling fluid through a fully annular cooling channel surrounding at least a portion of an inlet duct of the inlet header wherein the inlet header includes interior walls that define the cooling channel and exterior walls that form an outer structure of the inlet header and define an outer shape of the inlet header.

18. The method of claim 17, wherein flowing a second cooling fluid through a cooling channel comprises receiving the second cooling fluid a fluid source within a closed-loop fluid system and flowing the second cooling fluid through the cooling channel, wherein the second cooling fluid is one or more of ethylene glycol, oil, and water.

19. The method of claim 17, wherein flowing a second cooling fluid through a cooling channel comprises flowing a second portion of the bypass air flow as the second cooling fluid through the cooling channel.

20. The method of claim 19 further comprising:
flowing the first cooling fluid exiting the cold side into the bypass flow path downstream of the heat exchanger;
flowing the second cooling fluid exiting the cooling channel into the bypass flow path downstream of the heat exchanger; and
mixing the first cooling fluid and the second cooling fluid within the bypass flow path downstream of the heat exchanger.

* * * * *